Jan. 16, 1968  B. MILLS III  3,363,601
VALVE POSITION INDICATOR MECHANISM
Filed Aug. 2, 1965  2 Sheets-Sheet 1

Inventor:
Benjamin Mills, III
By Munn H. Hamilton
Attorney

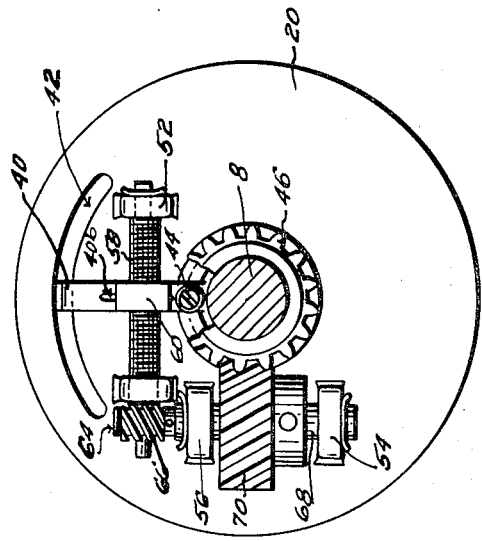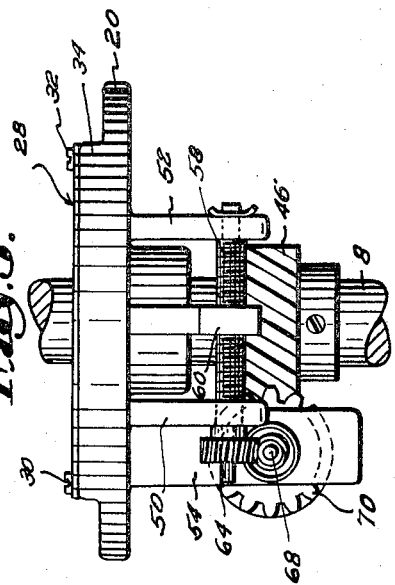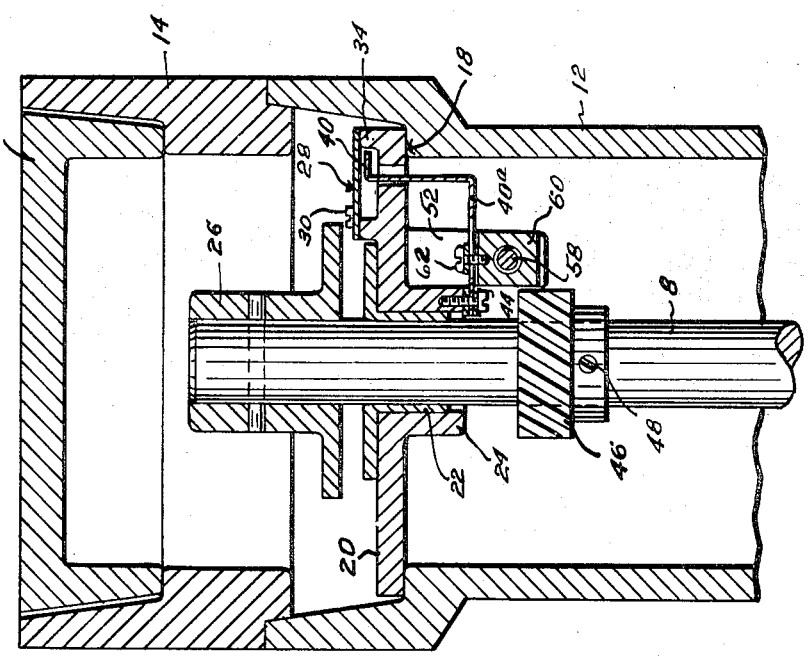

3,363,601
VALVE POSITION INDICATOR MECHANISM
Benjamin Mills III, 16 Cottage St.,
Wellesley, Mass. 02181
Filed Aug. 2, 1965, Ser. No. 476,282
4 Claims. (Cl. 116—125)

ABSTRACT OF THE DISCLOSURE

An indicator for an underground conduit valve includes in combination with a vertically disposed valve operator shaft an indicator dial mechanism having an arcuate dial supported at or near ground level. Gear means are suspended from the side of the indicator dial and operatively connected to the shaft. Rotative movement of the vertical disposed valve operator shaft actutates the gear means and positions a pointer along the indicator dial to precisely indicate when the valve is turned from an opened position to a closed position.

---

This invention relates to indicators and, more particularly, to a valve position indicating mechanism which is especially designed for use in showing the position of a valve of the butterfly type in buried surface installations for underground water mains and the like. Butterfly valves of the class referred to are customarily employed in opening and closing water mains located at considerable depths below ground level and as a result such valves are often actuated by elongated worm gear operators, including operator in-put shafts which may extend vertically downwardly from three or four foot depths down to a distance of from twenty-five to thirty feet.

In such installations torque forces applied through an in-put shaft of extended length may exert excessive turning forces and cause damage or failure in a valve or its operating parts. Excessive torque forces may, for example, be exerted by a workman in an effort to insure a complete valve closure without a satisfactory way of determining when a desired valve position is obtained. As a result valve damage has become rather widespread.

It is a chief object of the invention, therefore, to provide an improved valve position indicator which is designed to avoid the problems noted.

Another object of the invention is to devise a valve position indicating mechanism which can be quickly and conveniently installed with most forms of valve actuator assemblies now in use.

Another object is to provide a device of the class disclosed which may be readily inspected to denote quickly and conveniently when a valve actuator member has been placed in a desired operative position.

The general nature of the invention and its objects will be more fully understood and appreciated from the following description of the invention shown in the accompanying drawings, in which:

FIGURE 3 is a cross section taken on the line 3—3 of FIGURE 2;

FIGURE 4 is a detail plan view of the indicator means of the invention; and

FIGURE 5 is a side elevational view.

Referring more in detail to the drawings, numeral 2 denotes a tubular body which may be a water main or some other form of underground conduit for conducting fluid material along a desired path of flow. The conduit 2 is provided with a valve 4 of the well-known butterfly type. This valve may be turned into an open or closed position by roating the transverse shaft 6 in some convenient manner.

Figure 1:
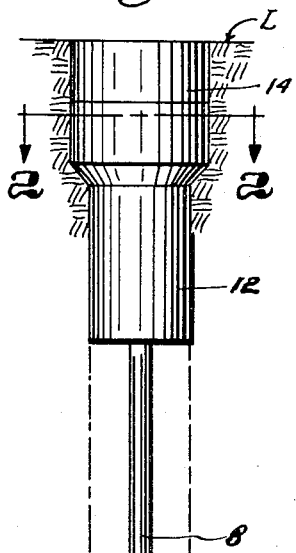
FIGURE 1 is a diagrammatic view illustrating in elevation portions of an underground water main with a butterfly valve and valve actuator mechanism shown combined with the indicator means of the invention.

One typical form of valve actuating means customarily employed in the art is shown diagrammatically in FIGURE 1 and consists of a vertically disposed valve actuator 8 which is connected through a gear housing 10 supported at one side of the conduit 2 and having mounted therein suitable driving gear means for turning shaft 6. The vertical actuator 8 may be vertically received in a tubular enclosure body 12 having a cover seat 14 and a cover 16 located thereon at a point just below ground level L as indicated generally in FIGURE 1.

In accordance with the invention, I provide a valve position indicator mechanism which is mounted inside of enclosure body 12 in some convenient manner as, for example, by means of a recessed shoulder part 18 formed at the inner periphery of the member 12 as suggested in FIGURE 3. The valve position indicator mechanism includes an annular indicator body 20 whose outer peripheral edges are designed to engage over the shouldered part 18 as also indicated in FIGURE 3.

Centrally formed through the indicator body 20 is an opening in which is located a bearing sleeve 22 for rotatably receiving therethrough the vertically disposed actuator 8. The underside of the indicator body 20 is further provided with a hub portion 24 in which the bearing sleeve 22 is snugly fitted as shown. The upper extremity of member 8 is allowed to project through the indicator body 20 to receive a driver head 26 about which a wrench or other tool may be engaged in order to exert rotative forces through the member 8. Turning the member 8 through the gear mechanism in the housing 10 thus operates the butterfly valve 4.

Figure 2:
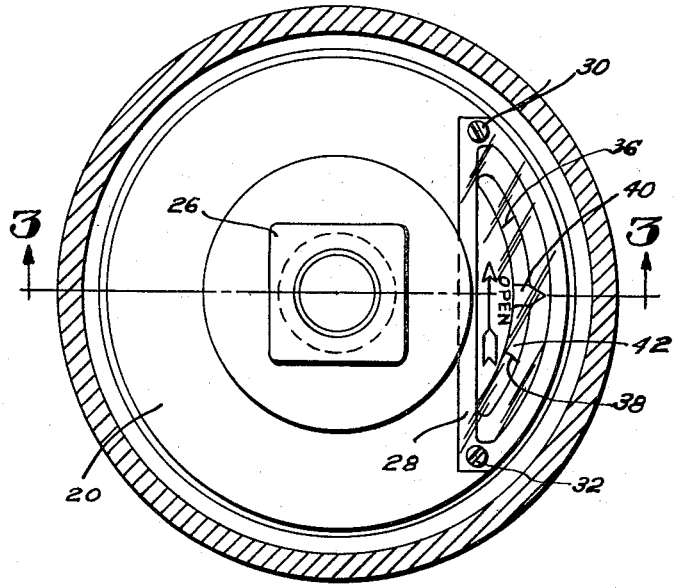
FIGURE 2 is a cross section taken on the line 2—2 of FIGURE 1.
Figure 2:
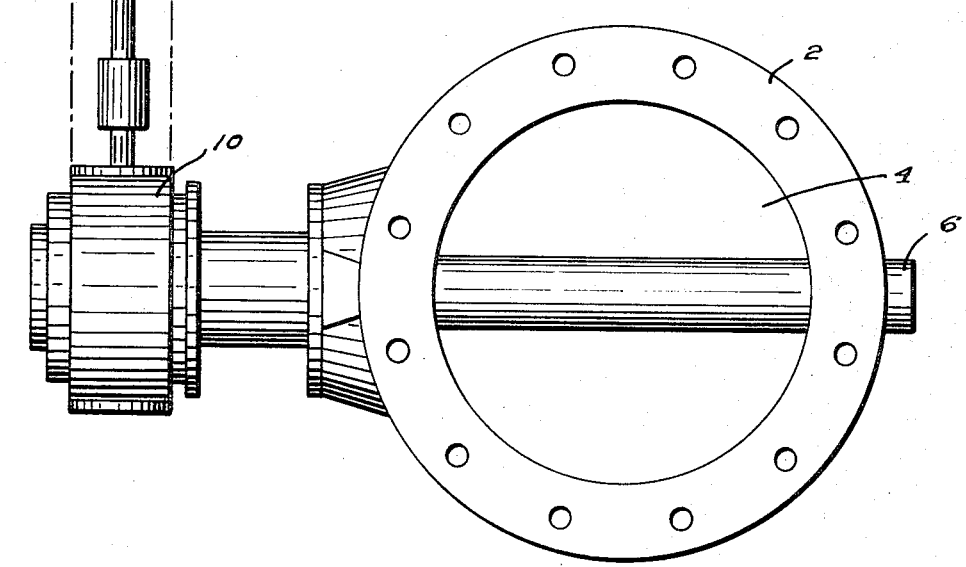

Mounted at the upper side of the indicator body 20 is an indicator dial part 28 which is more clearly shown in FIGURE 2 and which consists of a translucent plastic body of generally arcuate shape secured, for example, by fastenings as 30, 32 to a boss 34 integral with the indicator body 20. The dial part 28 has inscribed thereon a reference arrow and data denoting open and closed positions of butterfly valve 4 as included between two indicator limit marks 36 and 38.

Arranged to move into positions of register with the dial part 28 is a pointer 40 which extends through an arcuate slot 42 formed in the indicator body 20 as noted in FIGURE 4. The lower end of the pointer 40 is made with a right angularly shaped extension 40a having a slot 40b formed therein and also having an inner end portion pivotally attached to an adjacent bottom edge of the hub portion 24 by means of a pivot element 44 as is more clearly shown in FIGURE 4.

In order to move the vertically attached pointer described through a desired arc of travel, I provide a helical gear 46 which is solidly secured to the member 8 by a set screw 48 and I further provide a novel worm and gear means which is suspended on spaced brackets formed as an integral part of the indicator body 20. Numerals 50 and 52 denote two of the brackets and numerals 54 and 56 refer to two other brackets.

Rotatively mounted between the two brackets 50 and 52 is a lead screw 58 which has threaded thereon a block 60 at the upper side of which is a guide screw 62 (FIGURE 3) extending through the slot 40b of the pointer 40. By means of the arrangement described turning movement of the lead screw 58 provides for very gradual travel of the pointetr through an arcuate path of movement.

Rotation of the lead screw is carried out by means of a worm wheel 64 fixed to an end of lead screw 58 as shown in FIGURE 4 and meshing with a worm 66. The worm 66 is fast on another shaft 68 which extends at right angles to lead screw 58 and which is rotatable between the brackets 54 and 56 as noted in FIGURE 4. Also fixed to shaft 68 between the brackets 54 and 56 is a helical gear 70 arranged to mesh with and be driven by the gear 46 earlier noted as fixed on shaft 8.

An important feature of the arrangement of parts described is the specific positioning of the gear 70 in relation to the gear 46. Gear 70 is so located that the entire indicator assembly, once it has been put together, may be installed without having to remove or alter the position of the operator 8. This is accomplished by the particular suspension mounting of gear 70 above described which makes possible a very precise location of the teeth of gear 70 in engaging relationship with mating teeth of gear 46. This desirable positioning is realized by simply securing the gear 46 to member 8 at a predetermined point and then sliding the indicator assembly down over the member 8 until indicator body 20 bottoms on the shoulder part 18. At this time the gears 70 and 46 can come into meshing relationship and will remain in this position. Also the indicator assembly may be lifted up and removed when desired for checking or maintenance without having to disengage complicated locking or fastening means.

It will be apparent, therefore, that by thus combining a dial and pointer at the upper side of the indicator body in a viewing position and by securing all moving parts at the underside of the indicator body, maximum of convenience in installation and operation is realized with a minimum of exposure to wear or other undesirable conditions.

A further important feature of the particular arrangement of parts is the gradual displacement of the indicator pointer across the dial face by the gearing ratios employed so that a workman has ample opportunity to observe when a turning force is resulting in a point of nearly complete closure and thus an excessive torque force exerted after closure position is reached can be more readily avoided.

It will be understood that although I have shown a preferred embodiment of the invention, I may desire to carry out changes and modifications involving the use of convenient structures utilized within the scope of the appended claims.

I claim:
1. An indicator of the class described for use with a vertically disposed operator shaft and valve assembly comprising a driving gear fixed to the shaft at a predetermined level, a valve indicator body, means for setting the valve indicator body around the said vertically disposed operator shaft, gear means suspended from the underside of the indicator body and engageable with the driving gear when the indicator is in a fully seated position, a dial and pointer mechanism responsive to rotative movement of the vertically disposed operator shaft, said gear means including a rotatable lead screw suspended from bracket portions at the underside of the indicator body, a worm wheel fixed to one end of the lead screw, a worm shaft and worm independently suspended from said indicator body and arranged to mesh with said worm wheel, and a helical gear fixed to the worm shaft and positioned so that it moves into meshing relationship with the said driving gear when the indicator body reaches a fully seated position around the vertically disposed operator shaft.

2. A structure according to claim 1 in which the said dial and pointer mechanism includes a threaded block on the lead screw and means in the block for slidably engaging the pointer and moving it through an arcuate path of travel.

3. A structure according to claim 1 in which the pointer is formed with a slot and a guide located through the slot and fixed to the block.

4. A structure according to claim 1 in which the pointer is formed with a right angularly extending top section and the indicator body is recessed to provide an arcuate slot through which the top section of the pointer may move.

References Cited
UNITED STATES PATENTS

| | | | |
|---|---|---|---|
| 2,515,837 | 7/1950 | Quinn | 116—125 |
| 2,530,164 | 11/1950 | Harshbarger | 137—553 |
| 2,767,681 | 10/1956 | Pontius | 116—125 |
| 2,959,149 | 11/1960 | Schwenk | 116—125 X |
| 2,984,127 | 5/1961 | Schwenk | 116—125 X |

LOUIS J. CAPOZI, *Primary Examiner.*